(12) United States Patent
Zhuang

(10) Patent No.: US 8,862,401 B2
(45) Date of Patent: Oct. 14, 2014

(54) METHOD AND APPARATUS FOR SEARCHING POLYGON OBJECT THROUGH MAP DATABASE OF NAVIGATION SYSTEM

(75) Inventor: Jianning Zhuang, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 1809 days.

(21) Appl. No.: 11/732,562

(22) Filed: Apr. 4, 2007

(65) Prior Publication Data

US 2008/0249701 A1    Oct. 9, 2008

(51) Int. Cl.
*G01C 21/00* (2006.01)
*G01C 21/26* (2006.01)
G01C 21/36 (2006.01)
G08G 1/0969 (2006.01)

(52) U.S. Cl.
CPC ........ *G01C 21/3679* (2013.01); *G01C 21/3644* (2013.01); *G01C 21/3611* (2013.01)
USPC ............................ 701/532; 701/426; 701/438

(58) Field of Classification Search
CPC ........ G01C 21/26; G01C 21/28; G01C 21/30; G01C 21/32; G01C 21/3644; G01C 21/3679
USPC ............................................... 701/200
See application file for complete search history.

(56) References Cited

U.S. PATENT DOCUMENTS

| | | | | |
|---|---|---|---|---|
| 4,954,959 A | * | 9/1990 | Moroto et al. ................ | 701/211 |
| 5,204,817 A | * | 4/1993 | Yoshida ........................ | 701/411 |
| 6,278,940 B1 | | 8/2001 | Endo | |
| 2013/0204529 A1 | * | 8/2013 | Puchtler ........................ | 701/533 |

FOREIGN PATENT DOCUMENTS

JP        2003-315072        11/2003

* cited by examiner

*Primary Examiner* — Khoi Tran
*Assistant Examiner* — Dale Moyer
(74) *Attorney, Agent, or Firm* — Muramatsu & Associates

(57) ABSTRACT

A method and apparatus for searching polygon objects defined by polygon data in the map database of a navigation system when such polygon objects are not associated with any POIs. The method includes the steps of creating a data table which arranges information on the polygon objects in the map database based on polygon names, creating a data table which arranges information on the polygon objects in the map database based on polygon locations, prompting a user to specify a desired polygon object through a screen of the navigation system either by a polygon name or a polygon location, retrieving candidate polygon objects from the corresponding data tables that match inputs specified by the user and displaying a list of the retrieved polygon objects in a predetermined order, and allowing the user to finalize selection of the desired polygon object.

20 Claims, 12 Drawing Sheets

Fig. 2A

| Table A |
|---|
| Polygon Names<br>Center Points |

| Table B |
|---|
| Polygon Names<br>Center Points<br>Locations (State, County, City) |

Table C

| Polygon Name | Center Point | Location |
|---|---|---|
| A | . . . . | . . . . |
| B | . . . . | . . . . |
| C | . . . . | . . . . |

Table D

| Location | Polygon Name | Center Point |
|---|---|---|
| L | . . . . | . . . . |
| M | . . . . | . . . . |
| N | . . . . | . . . . |

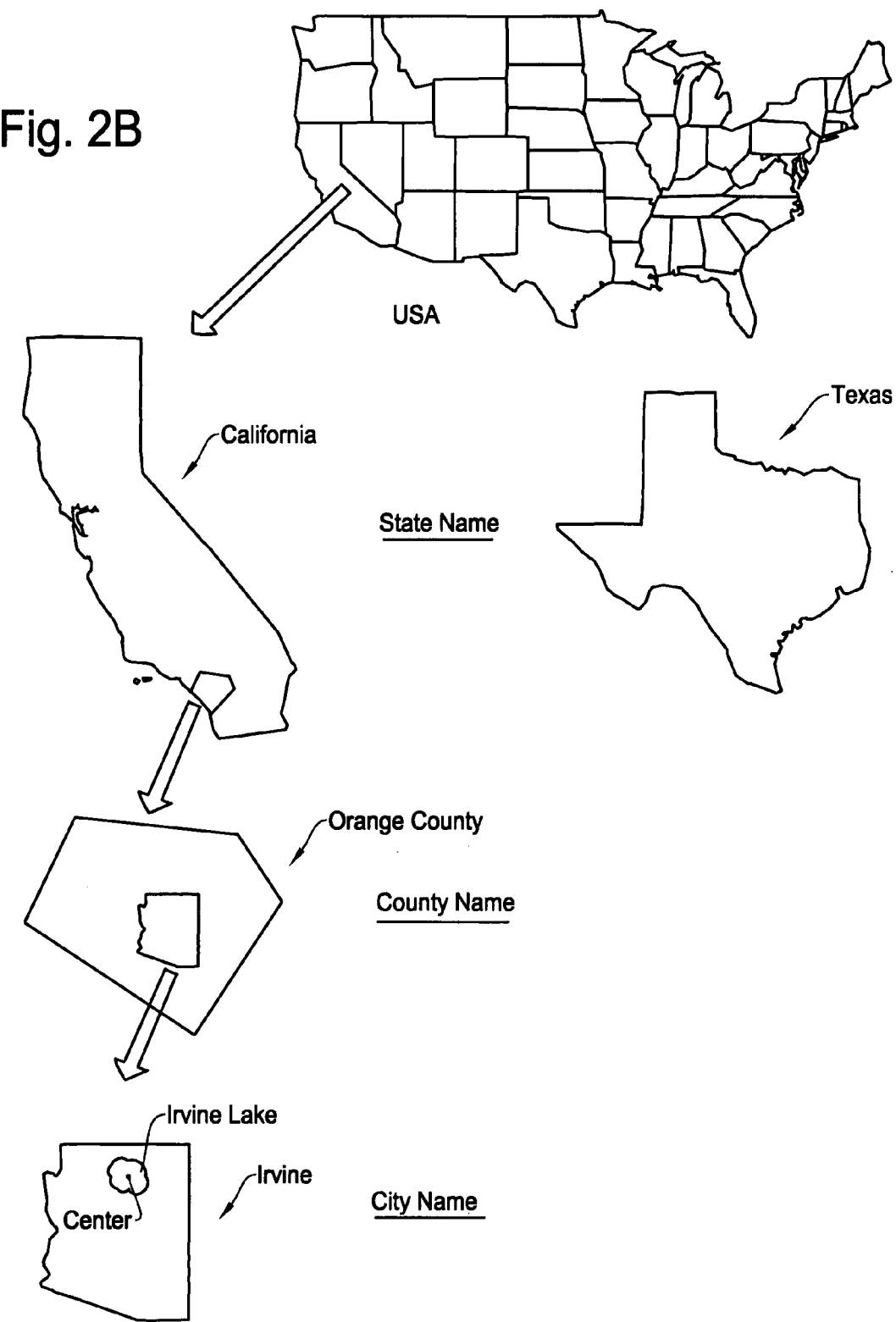

Fig. 2C

Table C

| Polygon Name | Center Point | Location |
|---|---|---|
| Opec Desert | Long. xxxxxx, Lat. yyyyyy | Santa Clara |
| Orange Coast | Long. xxxxxx, Lat. yyyyyy | Costa Mesa |
| Pacifica Court | Long. xxxxxx, Lat. yyyyyy | Newport Beach |
| Pacific Fall | Long. xxxxxx, Lat. yyyyyy | Santa Barbara |
| Pacific Heightsl | Long. xxxxxx, Lat. yyyyyy | Torrance |
| Pacific Ward | Long. xxxxxx, Lat. yyyyyy | San Fransisco |
| Pacific Wells Plaza | Long. xxxxxx, Lat. yyyyyy | Los Angeles |
| Paramount Hill | Long. xxxxxx, Lat. yyyyyy | San Diego |
| Quantum Lake | Long. xxxxxx, Lat. yyyyyy | Quantum |
| Rancho Mountain | Long. xxxxxx, Lat. yyyyyy | Orange |

Fig. 2D

Table D

| Location | Polygon Name | Center Point |
|---|---|---|
| Irvine | Irvine Lake | Long. xxxxxx, Lat. yyyyyy |
| Irvine | Irvine Spectrum | Long. xxxxxx, Lat. yyyyyy |
| Laguna Beach | Pacifica Heights | Long. xxxxxx, Lat. yyyyyy |
| Laguna Hills | Forest Hills | Long. xxxxxx, Lat. yyyyyy |
| Laguna Hills | Kegon Falls | Long. xxxxxx, Lat. yyyyyy |
| Los Angeles | Century Hills | Long. xxxxxx, Lat. yyyyyy |
| Los Angeles | Diamond Square | Long. xxxxxx, Lat. yyyyyy |
| Los Angeles | East of Eden | Long. xxxxxx, Lat. yyyyyy |
| Los Angeles | Hollywood Ball | Long. xxxxxx, Lat. yyyyyy |
| Los Angeles | LA Country Club | Long. xxxxxx, Lat. yyyyyy |

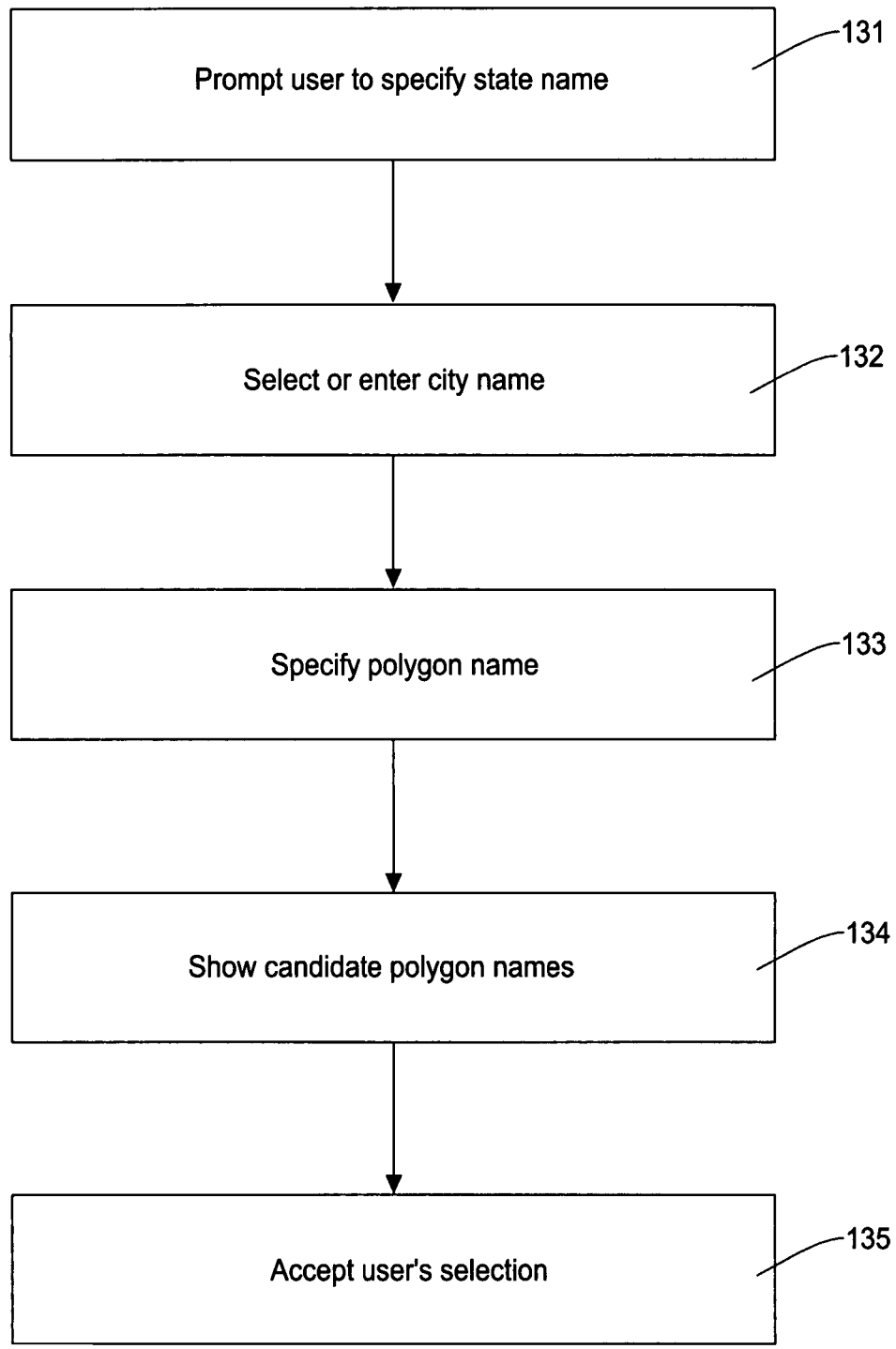

Fig. 7D

Enter State Name

City: CAL_ — 73

| A | B | C | D | E | F | G | H |
|---|---|---|---|---|---|---|---|
| I | J | K | L | M | N | O | P |
| Q | R | S | T | U | V | W | X |
| Y | Z | & | / | . | ' | | |
| SPACE | | BS | | ENTER | | RET | |

77 → I (highlighted)

Fig. 7E

Enter City Name

City: TOR_ — 73

| A | B | C | D | E | F | G | H |
|---|---|---|---|---|---|---|---|
| I | J | K | L | M | N | O | P |
| Q | R | S | T | U | V | W | X |
| Y | Z | & | / | . | ' | | |
| SPACE | | BS | | ENTER | | RET | |

77 → R (highlighted)

Fig. 7F

Enter Polygon Name

City: DEL AMO_ — 73

| A | B | C | D | E | F | G | H |
|---|---|---|---|---|---|---|---|
| I | J | K | L | M | N | O | P |
| Q | R | S | T | U | V | W | X |
| Y | Z | & | / | . | ' | | |
| SPACE | | BS | | ENTER | | RET | |

77 → R (highlighted)

METHOD AND APPARATUS FOR SEARCHING POLYGON OBJECT THROUGH MAP DATABASE OF NAVIGATION SYSTEM

FIELD OF THE INVENTION

This invention relates generally to a method and apparatus for searching polygon objects in a map database for a navigation system, and more particularly, to a method and apparatus for searching polygon objects defined by polygon data in the map database of a navigation system when there are no POI names, POI types or other identifications that are associated with the polygon objects.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), or a hard disc. Typically, the navigation system displays a map image on a monitor screen to guide the user to a destination.

FIGS. 1A-1H show an example of overall procedure and screen display involved in the navigation system for route guidance to a destination. FIG. 1A shows an example of locator map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the display screen.

An example of process for specifying a destination in the navigation system through a Point of Interest (POI) search method is shown in FIGS. 1B-1F. FIG. 1B show a "Find Destination by" screen for specifying an input method for selecting the destination. The "Find Destination By" screen lists various methods for selecting the destination including "Address" for specifying the city and address of the destination, "Intersection" for specifying the names of two streets which intersect with one another, and "Point of Interest (POI)" for selecting the programmed destination based on the name, category or telephone number.

When selecting, the "Point of Interest" method in FIG. 1B, the navigation system displays selection methods of point of interest (POI) either by "Place Name" or "Place Type" in FIG. 1C. The "Place Name" is to specify a name of the intended POI, and the "Place Type" is to specify a category of the intended POI. If the "Place Name" is selected in FIG. 1C, the navigation system displays a keyboard screen so that the user inputs the desired POI name as shown in FIG. 1D.

In FIG. 1E, as the user enters characters of a place name or specifies a particular place type, the navigation system will narrow down the candidate place name by searching a map database. FIG. 1F shows a screen where the candidate POI name is displayed thereon as a result of the user's input. In FIG. 1G, when the user confirms that the candidate POI is a desired place to go, the navigation system calculates an appropriate route to the destination. After determining the calculated route to the destination, the navigation system starts the route guidance operation as shown in FIG. 1H.

The majority of map data in the map database for the operation of the navigation system accounts for data directed to roads and links which are configured by large number of road segments. Each road segment is a small unit of line typically defined by at least two absolute locations, i.e., a start point and an end point. The map database also includes a large amount of data concerning points of interest (POIs) which express place names, addresses, phone numbers, etc. of restaurants, gas stations, shops, banks, ATMs, companies, hospitals, etc. Such POI data is arranged in a POI database within the map database.

The map database also includes polygon data which defines a two dimensional shape of an object. Typically, the polygon data define bounded regions of relatively large structures such as high rise buildings, factories, airports, stadiums, shopping malls, schools, etc., and natural objects such as lakes, rivers, mountains, fields, etc. The amount of polygon data has been increasing in the recent map database for achieving an improved performance of the navigation system.

In many occasions, such polygon objects defined by the polygon data are also points of interest (POI) and thus the information thereon may be stored in the map database as POI data. Consequently, shopping malls, buildings, schools, airports, etc., defined by the polygon data can be searched through the POI search method as described above without using the polygon data. The route guidance operation to the selected polygon object (POI) can be done by the well established functions of the navigation system. However, currently, there are polygon objects that are defined by polygon data that are not associated with any POIs, i.e., not included in the POI database.

As noted in the foregoing description for finding a destination for the route guidance, the POI search method is often used because this search method is well established in the industry with use of place name, place type, phone number, etc. When the user has a particular destination in mind that involves polygon data but is not associated with a POI, such as a name of a particular building, finding the location poses a problem. Further, when the user recognizes the name of a building but does not know any POIs associated with the building, it is difficult to find the building since the POI search method will not produce the name and address of the building.

Therefore, there is a need of a new search method and apparatus for searching an object that is defined by polygon data but is not associated with any POI.

SUMMARY OF THE INVENTION

It is, therefore, an object of the present invention to provide a method and apparatus for a navigation system to search a polygon object that is defined by polygon data in the map database which is not associated with any point of interest (POI).

It is another object of the present invention to provide a method and apparatus for a navigation system to search a polygon object that is not associated with any POI and to conduct a route guidance operation to the selected polygon object.

It is a further object of the present invention to provide a method and apparatus for a navigation system to search a polygon object in the map database by creating data tables on the polygon objects based on the polygon data in the map database.

It is a further object of the present invention to provide a method and apparatus for a navigation system to search a polygon object by creating data tables on polygon objects to retrieve information on the polygon objects either through polygon locations or polygon names.

One aspect of the present invention is a method for searching a polygon object in a map database of a navigation system when the polygon object is not associated with any points of interest (POIs). The method includes the steps of creating a data table which arranges information on the polygon objects in the map database based on polygon names, creating a data table which arranges information on the polygon objects in the map database based on polygon locations, prompting a user to specify a desired polygon object through a screen of the navigation system either by a polygon name or a polygon location, retrieving candidate polygon objects from the corresponding data tables that match inputs specified by the user and displaying a list of the retrieved polygon objects in a predetermined order, and allowing the user to finalize selection of the desired polygon object.

In the method for searching a polygon object, the step of prompting the user to specify a desired polygon object includes a step of displaying a keyboard and an input field to allow the user to enter characters concerning the desired polygon object in the input field. Further, the step of prompting the user to specify a desired polygon object includes a step of displaying a list of candidate entries retrieved from the data tables in response to information specified by the user. The step of displaying a list of candidate entries includes a step of listing the candidate entries in an order of distance from a specified position or an alphabetical order.

In the method for searching a polygon object under the present invention, the step of prompting the user to specify a desired polygon object includes a step of specifying a location of the polygon object stored in the data table where the location is specified by a name of administrative region. The name of administrative region indicating the location includes at least a city name.

In the method for searching a polygon object, the step of prompting the user to specify a desired polygon object includes a step of specifying a location of the polygon object stored in the data table where the location is specified by a name of administrative region, and a step of specifying a polygon name stored in the data table after specifying the administrative region. Alternatively, the step of prompting the user to specify a desired polygon object includes a step of specifying a polygon name without specifying an administrative region.

In the method for searching a polygon object, the step of creating the data table based on the polygon locations includes a step of obtaining a position of a center point of the polygon object to determine in which administrative region the center point of the polygon object is located where the administrative region includes a state, a county, and a city.

In the method for searching a polygon object under the present invention further includes a step of calculating a route to the selected polygon object and conducting a route guidance operation to the selected polygon object, and when the center point of the polygon object is not on any road, an address of the polygon object for calculating the route is determined by shifting the center point to an adjacent point on a road so that an address of the point on the road can be used as a destination address for the route calculation.

Another aspect of the present invention is an apparatus for a navigation system which allows a user to search a polygon object that is not associated with any POI in the map database. The apparatus of the present invention creates the data tables concerning the polygon objects so that a desired polygon object can be searched through the data tables either by a polygon name or a polygon location. The navigation system enables to specify the detected polygon object as a destination to guide the user to the selected polygon object.

According to the present invention, the navigation system enables to easily search the polygon objects when such polygon objects are not associated with POI data in the map database of the navigation system by implementing the various operational steps in the method of the present invention noted above. The present invention creates the data tables concerning the polygon objects so that a desired polygon object can be searched through the data tables (polygon database) either by a polygon name or a polygon location. The polygon locations are administrative regions such as states, counties, cities, etc. in which a center point of the polygon object is located. With use of the data tables for the polygon objects, the user can search a desired polygon object through the data tables and set the polygon object as a destination for a route guidance operation.

BRIEF DESCRIPTION OF THE DRAWINGS

FIGS. 2A-2D are schematic diagrams showing an example of data tables that will be prepared for implementing the polygon search method under the present invention where FIG. 2A shows a process for creating the data tables to access the polygon objects by name or location, FIG. 2B shows a map image for determining locations of polygon objects based on administrative regions, FIGS. 2C and 2D show examples of data contents in the data tables.

FIG. 3 is a flow chart showing an example of overall steps of operation of the navigation system in finding a desired polygon object by narrowing down candidate polygons from geographic locations.

FIGS. 7A-7I are schematic diagrams showing screen display examples associated with the polygon search method and apparatus under the present invention where FIGS. 7A-7C show screens having name lists, FIG. 7D-7F show screens having keyboards, FIG. 7G shows a screen when the same polygon name exists in two or more locations, FIG. 7H shows a screen with a polygon image, and FIG. 7I shows a screen for confirming a destination.

DETAILED DESCRIPTION OF THE PREFERRED EMBODIMENT

Figure 1A:
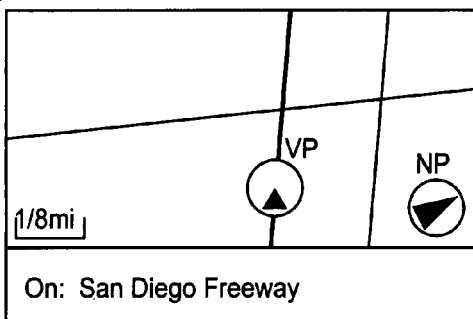
FIGS. 1A-1H are schematic diagrams showing an example of operational process and screen display involved in the navigation system for selecting a destination and conducting a route guidance operation to the destination.
Figure 1B:
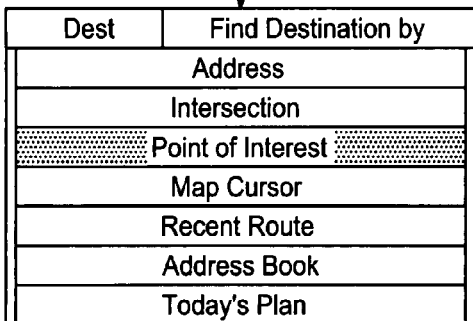
Figure 1C:
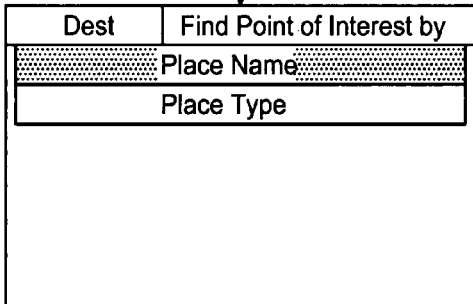
Figure 1D:
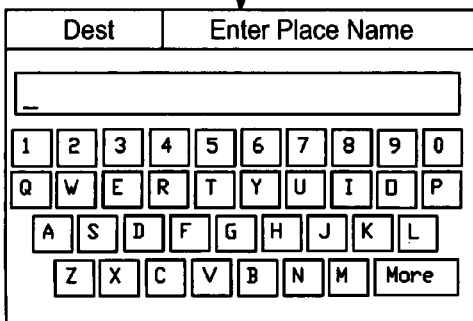
Figure 1E:
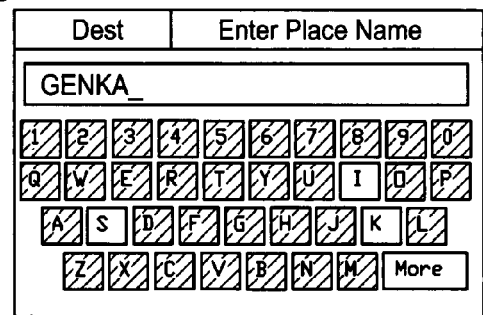
Figure 1F:
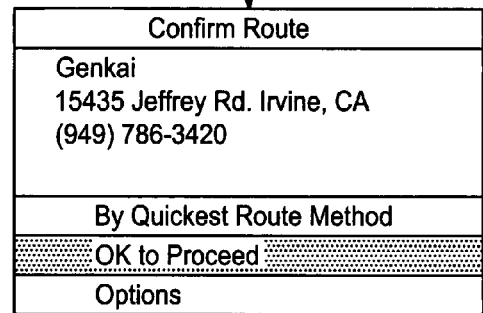
Figure 1G:
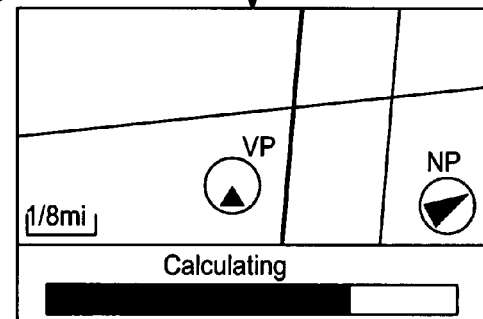
Figure 1H:
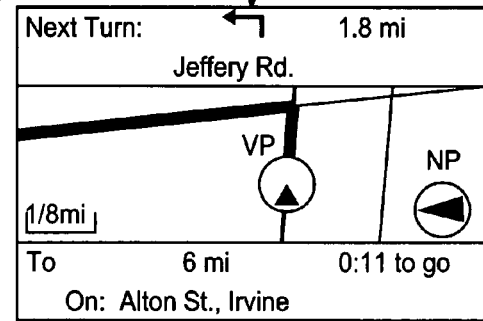

The method and apparatus for searching a polygon object in the present invention is explained in detail with reference to the accompanying drawings. The present invention enables to easily search polygon objects when such polygon objects are not associated with POI data in the map database of the navigation system. The present invention creates data tables concerning the polygon objects so that a desired polygon object can be searched through the data tables (polygon database) either by a polygon name or a location. Such polygon locations are administrative regions such as states, counties, cities, etc. in which a center point of the polygon object is located.

With use of the data tables for the polygon objects, the user can search a desired polygon object that is not associated with POIs and sets the polygon object as a destination for a route guidance operation. It should be noted that although the description will be made where the polygon search method and apparatus of the present invention is implemented to a vehicle navigation system, the polygon search method and apparatus of the present invention can be implemented to other devices, such as portable devices, personal computers, cellular phones, etc.

With reference to FIGS. 2A-2D, the procedure of creating the data tables to be used in the polygon object search of the present invention will be described. First, center points (centroid) of polygon objects in the map database are calculated for all the polygon objects that have names. Because polygon data defines a two-dimensional topological shape of a polygon object, the map database includes absolute positions of shape points on the polygon object as part of polygon data, thereby enabling to obtain the center location. Each center point is defined by an absolute position which is expressed by longitude and latitude coordinate data. Based on the polygon names and data indicating the center points of the polygon objects, the method of the present invention creates a data table A as shown in FIG. 2A.

Next, based on the data indicating the center points of the polygon objects that have been determined in creating the data table A, a location of each polygon object is determined. Specifically, by determining which state boundaries and city boundaries the center points of the polygon are located, the location information as to the state, county, city or other administrative regions for each polygon object will be determined. Because a polygon object can be a large lake, river, etc., that extends through two or more administrative regions, the center point is defined with respect to the administrative region. Another reason for determining the administrative region is to create an address of the polygon object because the address data is not readily available from the map database since the polygon objects are not associated with POIs.

Thus, the data is obtained such as a polygon object having a name "UC Irvine" and a center point of "latitude 37.6997" and "longitude −83.9903", which falls in the city of "Irvine". The name of the location may also include such jurisdictional boundaries as county names in addition to the state name and city name. For each polygon object, the information concerning the absolute location of the center point, the information regarding to which administrative region the center point belongs, and the name of the polygon object are stored in the data table B as shown in FIG. 2A.

Next, based on the data table B obtained in the procedure described above, a data table C and a data table D are respectively created. The data table C has the same contents of data as that of the data table B, but the data are sorted by the names of polygon objects. Likewise, the data table D has the same contents of data as that of the data table B, but the data are sorted by the locations of the center points of the polygon objects.

FIG. 2B shows a map image to explain how the center point of the polygon object is classified with respect to the administrative regions, such as states, counties, and cities of the whole country when creating the data tables. The center point of the polygon object is classified into a small administrative region, typically to a unit of city. This example shows the case where a polygon object "Irvine Lake" is classified into a location of a city of "Irvine" in a county of "Orange" in a state of "California".

With respect to the data table C, a sorting operation is performed based on polygon names, an example of the data contents in the data table C is shown in FIG. 2C. With respect to the data table D, a sorting operation is performed based on the locations, i.e., state names, county names, or city names, an example of the data contents in the data table D is shown in FIG. 2C. The data table C and the data table D will be actually used as a polygon database in the method and apparatus of the present invention as described below.

Figure 4:
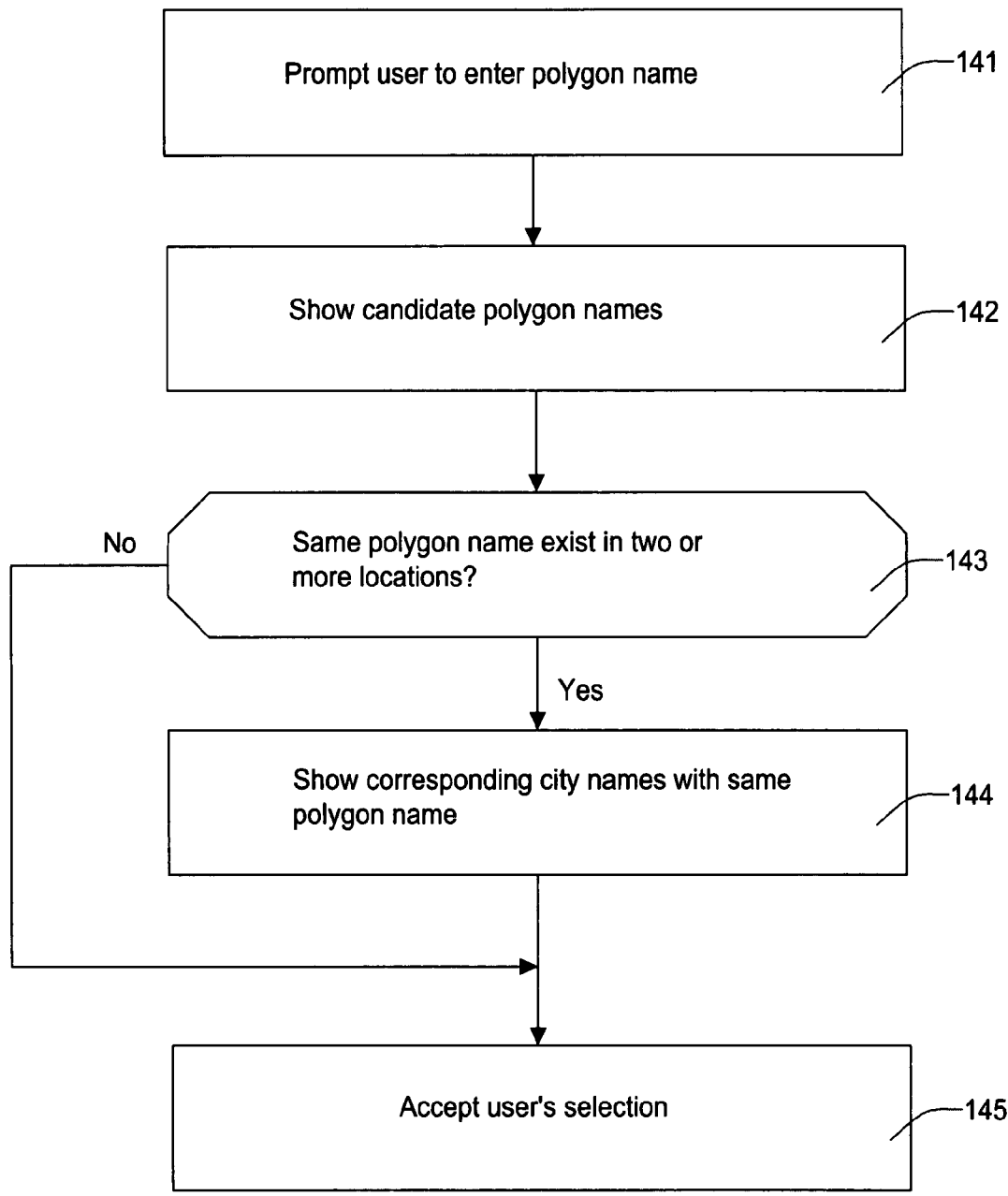
FIG. 4 is a flow chart showing another example of overall steps of operation of the navigation system in finding a desired polygon object by inputting a name of a polygon object.

The procedure of the method and apparatus in the present invention using the data tables shown in FIGS. 2C and 2D for searching a polygon object is explained with reference to the flow charts of FIGS. 3 and 4. The procedure of FIG. 3 shows the steps for allowing the user to narrow down an intended polygon object from candidate polygon objects by selecting a geographic area such as a state name or a city name. The procedure of FIG. 4 shows the steps for allowing the user to narrow down an intended polygon object from candidate polygon objects by selecting a name of the polygon object.

Figure 7A:
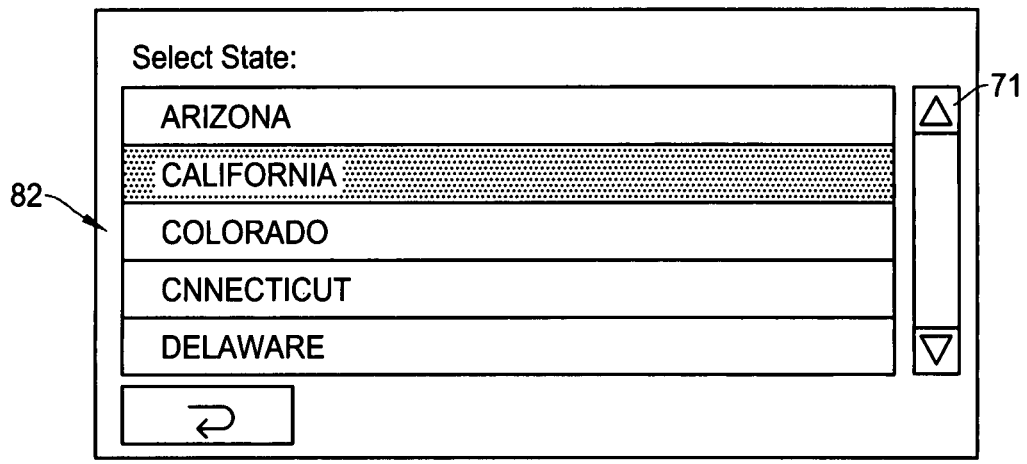

In the process of FIG. 3, at the step 131, the navigation system prompts the user to enter a state name where a desired polygon object such as a building, a landmark, or a mountain, etc., is located. The user may select a state name from a list of state names through a touch screen such as shown in FIG. 7A. In addition to the touch screen, user may use other input device such as physical buttons or a remote controller to select the state name as well. Alternatively, the user may input a state name in an input field 73 on the navigation screen through a keyboard 77 as shown in FIG. 7D.

Figure 7B:
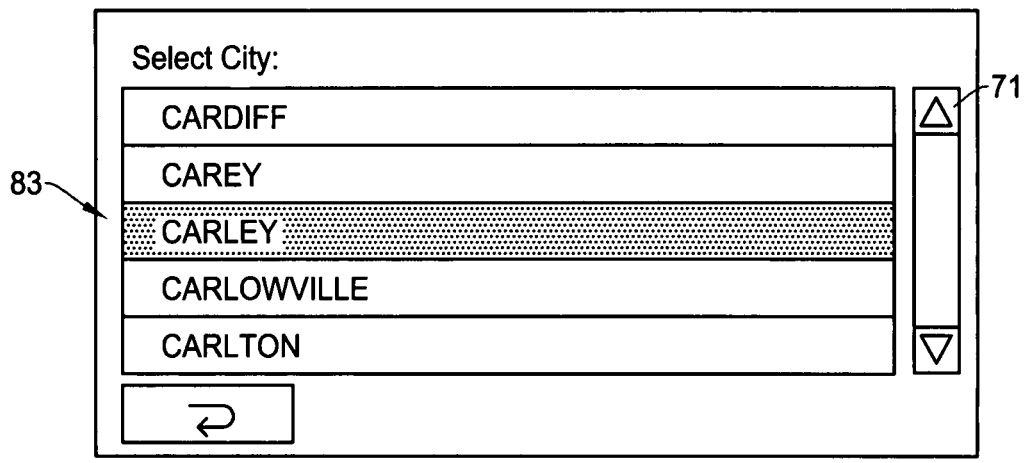

Then, the navigation system prompts the user to specify a city name within the selected state in the step 132. Before selecting a city name, the process may provide a step for selecting a county name although not shown in FIG. 3. When the user selects the state name in the above step, the navigation system may display a list 83 of city names as shown in FIG. 7B. In the list 83, the city names will be listed in a predetermined order such as an order of distance from the current position or other specified position or an alphabetical order. The user can scroll the list 83 by operating a scroll key 71 to find a desired city name within the selected state. Alternatively, the user may input a city name in an input field 73 on the navigation screen through a keyboard 77 as shown in FIG. 7E.

Figure 7C:
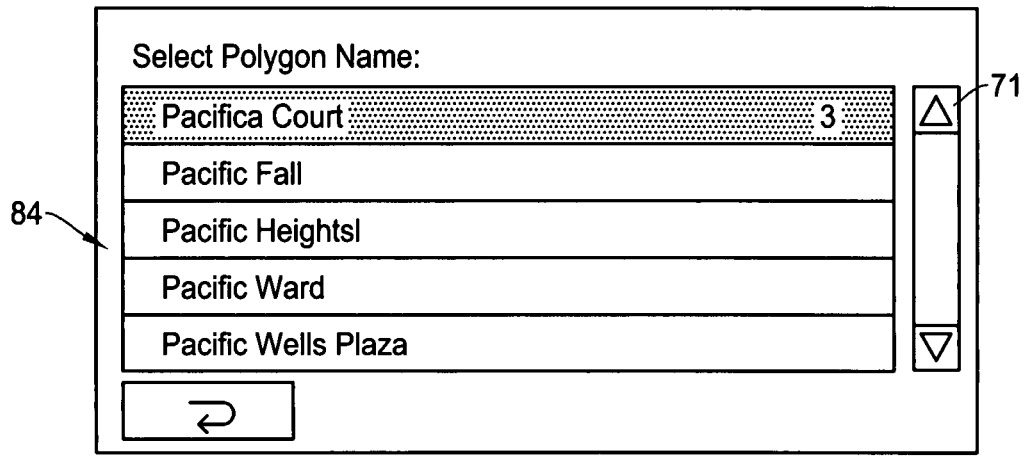

Further in the process of FIG. 3, the user is prompted to specify a polygon name within the selected city in the step 133. For example, when the user selects the city name in the above step, the navigation system may display a list 84 of polygon names as shown in FIG. 7C. In the list 84, the polygon names will be listed in a predetermined order such as an order of distance from the current position or other specified potion or an alphabetical order.

The user can scroll the list 84 by operating a scroll key 71 to find a desired polygon name within the selected city. Alternatively, the user may input a polygon name in an input field 73 on the navigation screen through a keyboard 77 as shown in FIG. 7F. As soon as receiving one or more characters of the polygon name, the navigation system will display candidate polygon names in the step 134 so that the user can select one of the polygon names.

As the user selects the desired polygon name, the navigation system accepts the selection in the step 135 and performs required operation, such as calculating a route to the selected polygon object and conducting a route guidance operation.

When calculating the route to the selected polygon object, in the case where a location of the center point of the polygon object is not on a road, the center point may be shifted to an adjacent point on a road so that an address of the point on the road can be used as a destination address for the route calculation. The above procedure directed to the steps 131 and 132 utilizes the data table D to retrieve polygon objects within the selected state and city. The above noted step 131 for selecting or inputting the state name may be omitted so that the city name can be searched from all over the country without specifying a state or a county.

FIG. 4 shows another example of process for finding a polygon object where the process begins to search an intended polygon object by entering a polygon name. In the step 141, the navigation system prompts the user to enter a polygon name, such as "Pacifica Court" or "Lake Matthew" by displaying a keyboard on the screen as shown in FIG. 7F. Upon receiving the characters in the input field 73, the navigation system checks the data table C in FIG. 2C to search matching polygon names.

In the step 142, as soon as receiving one or more characters, the navigation system retrieves the matching polygon names and displays a list of candidate polygon names. An example of screen of the navigation system showing the retrieved candidate polygon names is illustrated in FIG. 7C in which five candidate polygon names are shown in the list 84. Additional polygon names may be shown by scrolling the screen with use of the scroll key 71. In this example, the polygon name "Pacifica Court" in the list 84 includes a number "3" at the right which indicates that three entries having the name "Pacifica Court" exist in the polygon database (data table C).

Figure 7G:
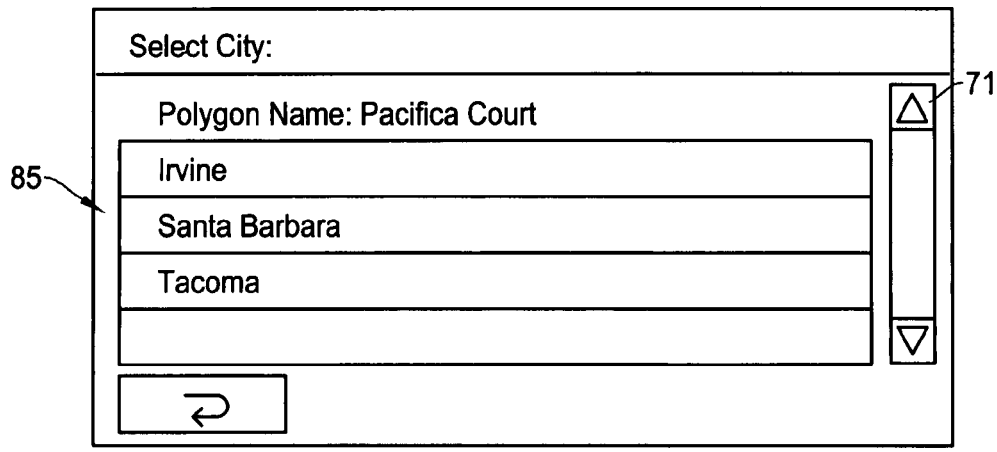

When the user selects a polygon name from the list, the navigation system checks, in the step 143, whether the selected polygon name exists in two or more different locations. This case arises when the user selects a polygon name such as "Pacifica Court" in the above example where this polygon name exist in three locations. If it is determined that the same polygon name exists in two or more locations in the step 143, the navigation system displays city names corresponding to the selected polygon name so that the user can select a city name among a plurality of cities to select a desired polygon object in the step 144. An example of screen 85 of the navigation system that shows two or more city names for the same polygon name is shown in FIG. 7G. Finally, the user selects the intended polygon object in the step 145.

Figure 5:
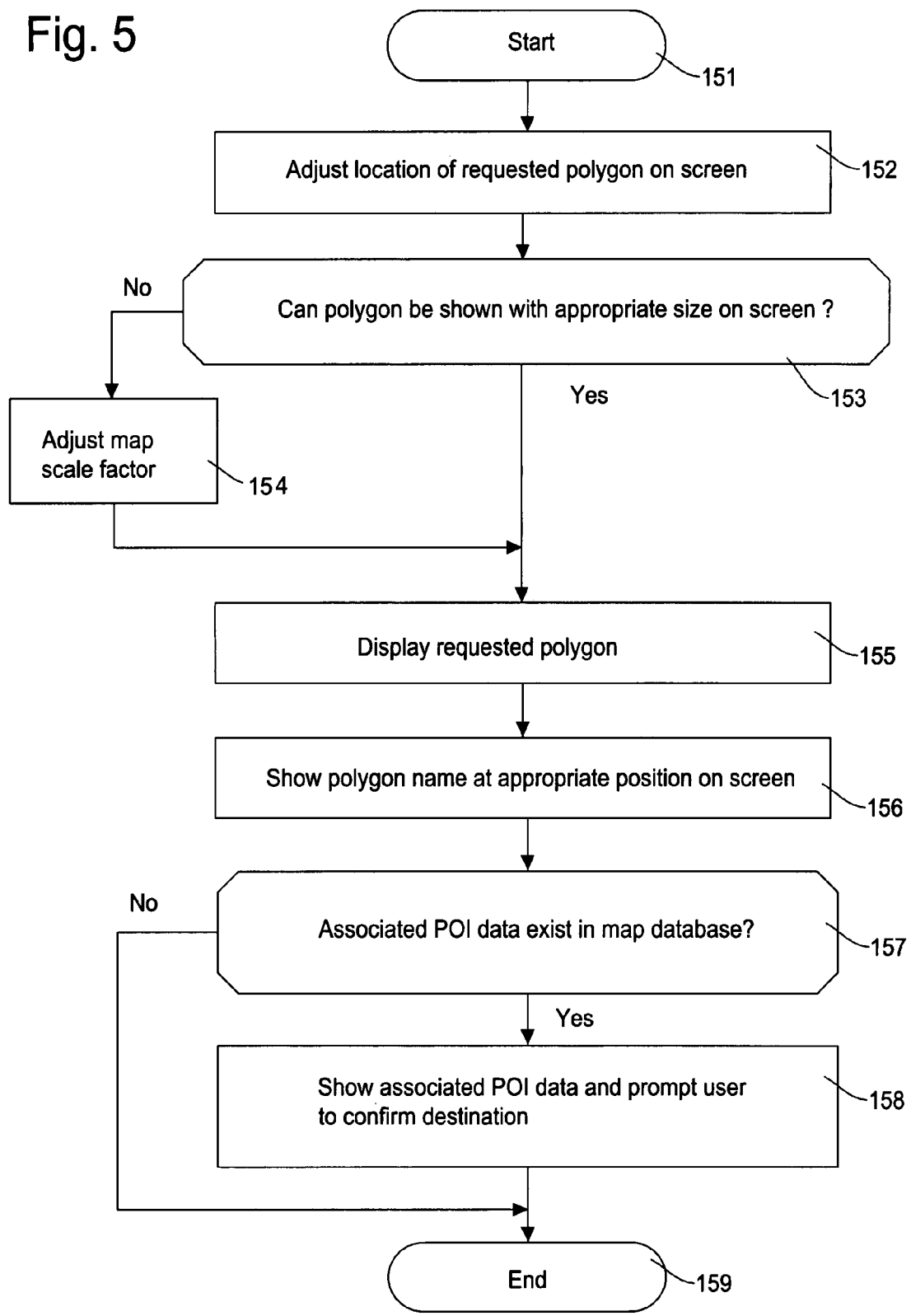
FIG. 5 is a flow chart showing an example of procedure for displaying an image of a polygon object under the present invention.

An example of procedure for displaying a polygon image under the present invention is described by the steps shown in the flow chart of FIG. 5. When the user selects to view a particular polygon, the navigation system starts the operation at the step 151. Then in the step 152, the navigation system adjusts the position of the selected polygon on the screen by, for example, positioning the center point of the selected polygon at about the center of a polygon display area.

Then, the navigation system determines whether the polygon image can be drawn with an appropriate size, for example, within a polygon display area 75 (FIG. 7H) in the step 153. If the polygon cannot be shown within the screen or too small to be appropriately seen by the user, the navigation system adjusts a map scale factor in the step 154. This process of adjusting the map scale factor can also be done manually by the user. Thus, the image of the selected polygon object will be displayed in the polygon display area 75 in the step 155 as shown in an example of screen 86 of FIG. 7H. In addition to the two-dimensional image and the polygon name, the navigation system may also show a location of the center point of the selected polygon object in the step 156.

Figure 7H:
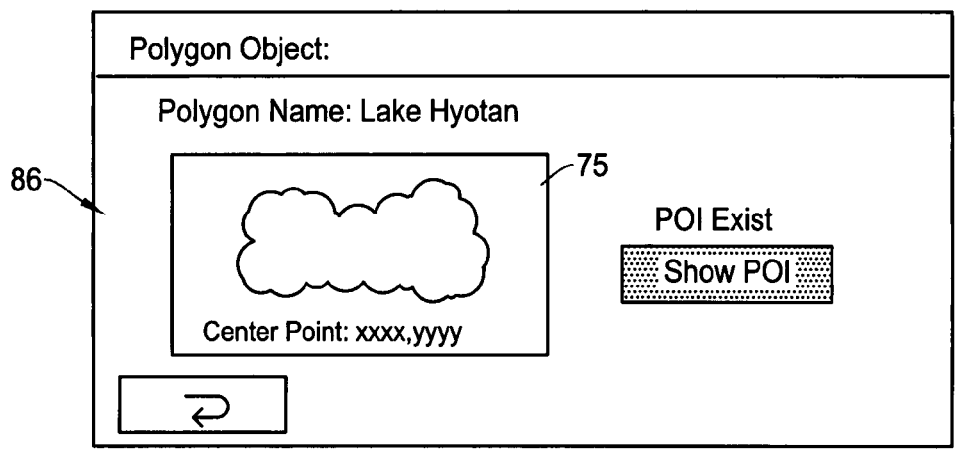

In the step 157, the navigation system checks whether there is any POI data associated with the selected polygon object in the map database. For instance, a polygon representing a large building may have several businesses associated with the building. Alternatively, the information regarding the selected polygon may be included in the existing POI database. If such an associated POI is found, the navigation system notifies the user that the POI data exists for the selected polygon object as shown in FIG. 7H to prompt the user to determine whether the user wants to see the POI data. In response to the user's request, in the step 159, the navigation system displays the POI data for the selected polygon object.

Figure 6:
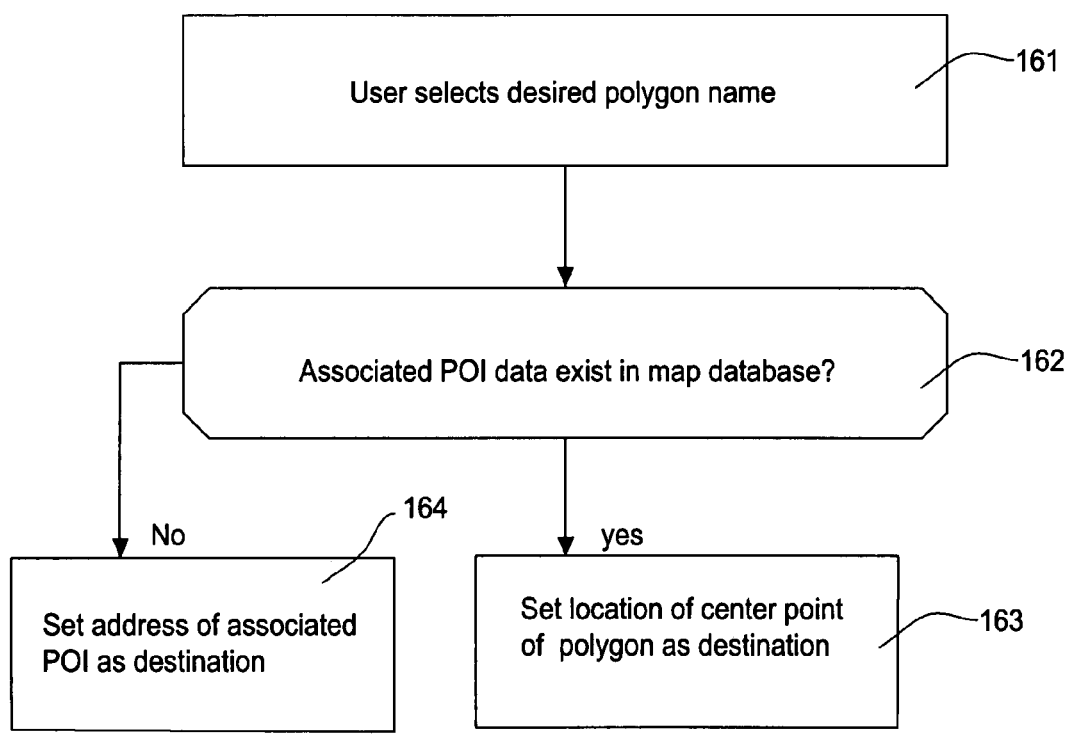
FIG. 6 is a flow chart showing an example of procedure for selecting a destination address with respect to a selected polygon data under the present invention.

For the purpose of guiding the user to a selected polygon object, the navigation system can improve the accuracy of guidance to the selected polygon object by following the procedure shown in the flow chart in FIG. 6. This procedure is to use the address data of a POI for calculating a route to the selected polygon object when a POI is associated with the selected polygon object. When the user selects a polygon object in the step 161, the navigation system proceeds to check whether there is a POI associated with the polygon object in the POI database of the navigation system in the step 162.

Figure 7I:
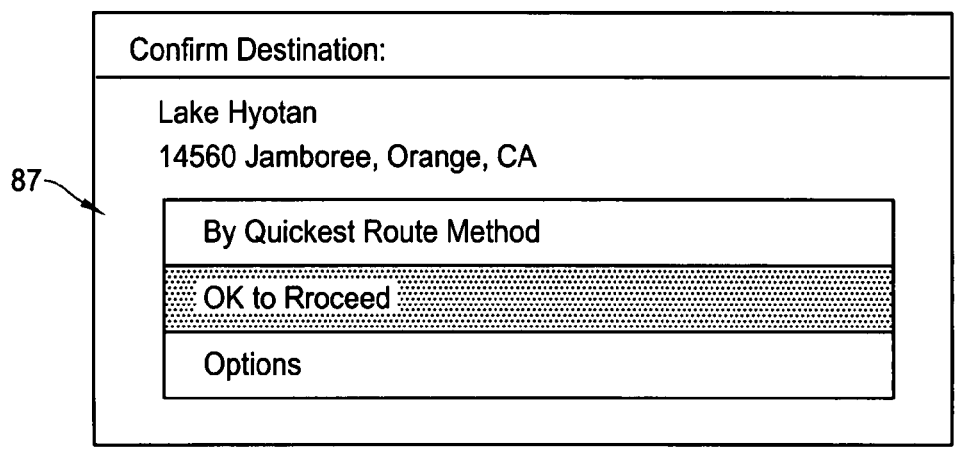

When an associated POI is found, the navigation system sets the address of the associated POI as a destination in the step 163. This is based on the assumption that the associated POI is likely to be an actual destination and close to the entry point of the polygon object as well. Preferably, the navigation system displays a screen 87 as shown in FIG. 7I so that the user confirms the destination by selecting an "OK to Proceed" menu. When no associated POIs exists, the center point of the polygon object will be set as the destination in the step 164. After the destination has been set, the navigation system calculates a route to the destination and starts the route guidance operation to the selected polygon object. When calculating the route to the selected polygon object, in the case where a location of the center point of the polygon object is not on a road, the center point may be shifted to an adjacent point on a road so that an address of the point on the road can be used as a destination address for the route calculation.

Figure 8:
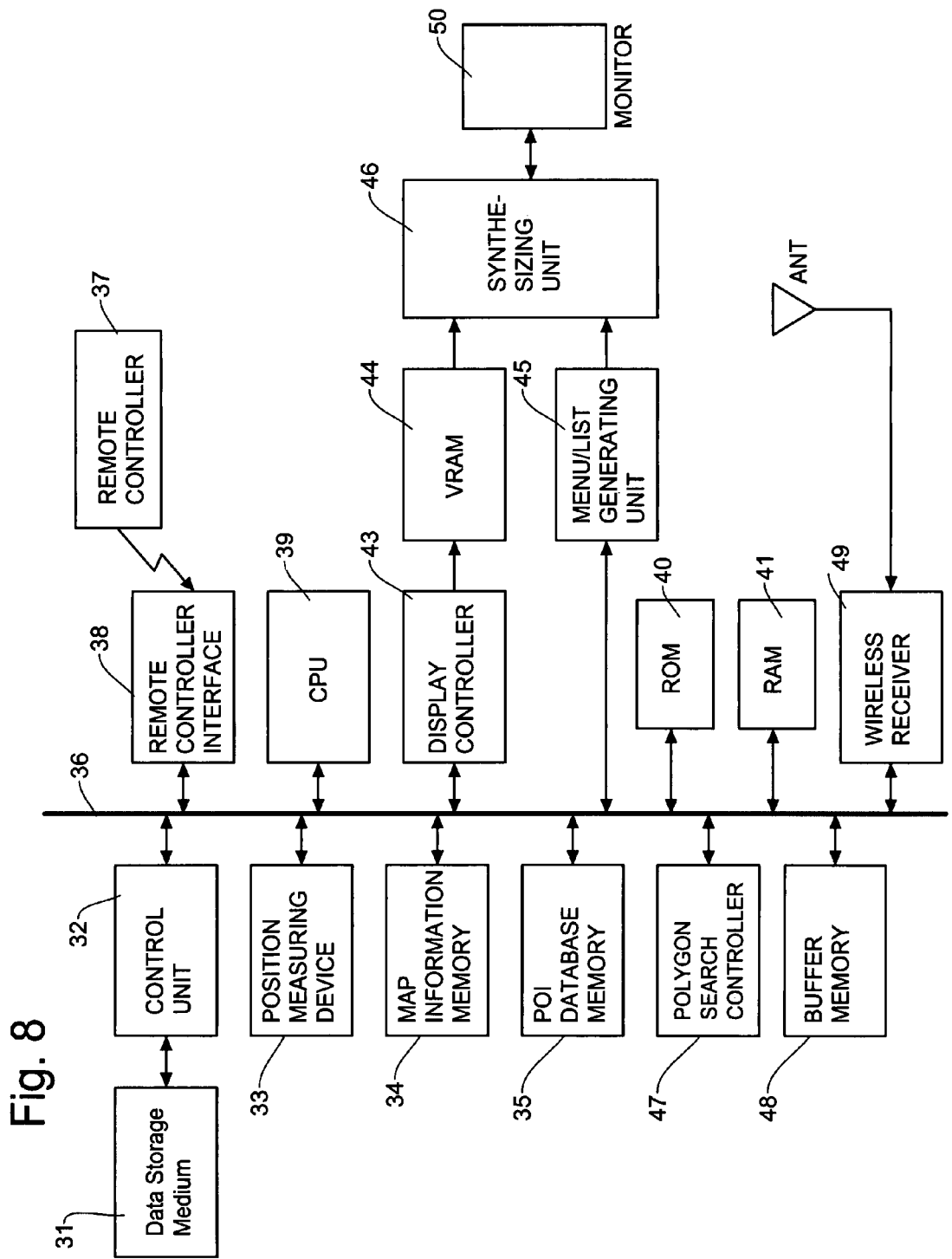
FIG. 8 is a block diagram showing an example of configuration of a vehicle navigation system implementing the polygon search method of the present invention.

FIG. 8 shows an embodiment of the structure of a vehicle navigation system for implementing the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage medium 31 such as a hard disc, CD-ROM, DVD or other storage means (hereafter "data disc") for storing the map data. The navigation system includes a control unit 32 for controlling an operation for reading the information from the data storage medium 31, and a position measuring device 33 for measuring the present vehicle position or user position. For example, the position measuring device 33 has a vehicle speed sensor for detecting a moving distance, a gyroscope for detecting a moving direction, a microprocessor for calculating a position, a GPS (global positioning system) receiver for receiving GPS signals from artificial satellites, and etc.

The block diagram of FIG. 8 further includes a map information memory 34 for storing the map information which is read from the data disc 31, a database memory 35 for storing database information such as point of interest (POI) information which is read out from the data storage medium 31, a remote controller 37 for executing a menu selection operation, an enlarge/reduce operation, a destination input operation, etc. and a remote controller interface 38. Although a remote controller is a typical example of input device for selecting menus, executing selected functions and etc., the navigation system includes various other input methods to achieve the same and similar operations done through the remote controller.

In FIG. 8, the navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a display controller 43 for generating map image (a map guide image and an arrow guide image) on the basis of the map information, a VRAM 44 for storing images generated by the display controller 43, a menu/list generating unit 45 for generating menu image/various list images, a synthesizing unit 46, a wireless transmitter 49 for wireless communication to retrieve data from a remote server, a polygon search controller 47, a buffer memory 48 for temporally storing data for ease of data processing, and a monitor (display) 50. The map image to be displayed is stored in VRAM 44.

The polygon search controller 47 controls an overall operation for searching a polygon object. The ROM 40 stores a program that performs the operation described with reference to the flow charts of FIGS. 3-6, which is executed by the polygon search controller 47. The polygon search controller 47 can be a part of the CPU 39 or a separate processor. The polygon search controller 47 checks the data tables C and D shown in FIGS. 2C and 2D to search and retrieves polygon objects in response to the user's request. The polygon search controller 47 controls the navigation system to display various screens for the operation of the present invention such as shown in FIGS. 7A-7I to allow the user to find a desired polygon object. Thus, the method and apparatus of polygon search is able to find a desired polygon effectively even when there is no POI associated with the particular polygon.

As has been described above, according to the present invention, the navigation system enables to easily search the polygon objects when such polygon objects are not associated with POI data in the map database of the navigation system. The present invention creates the data tables concerning the polygon objects so that a desired polygon object can be searched through the data tables (polygon database) either by a polygon name or a polygon location. The polygon locations are administrate regions such as states, counties, cities, etc. in which a center point of the polygon object is located. With use of the data tables for the polygon objects, the user can search a desired polygon object through the data tables and set the polygon object as a destination for a route guidance operation.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method for searching a polygon object for a navigation system, comprising the following steps of:
    finding a center point of a polygon object where the polygon object is a two-dimensional topological object expressed in a map database of the navigation system;
    creating a data table which arranges information on the polygon objects in the map database of the navigation system based on polygon names when the polygon object has not been associated with points of interest (POIs) in a map database of the navigation system;
    creating a data table which arranges information on the polygon objects in the map database of the navigation system based on polygon locations where each of the polygon locations is defined by the center point of the polygon object;
    specifying a desired polygon object through a screen of the navigation system either by a polygon name or a polygon location;
    retrieving, by a processor, candidate polygon objects from the corresponding data tables that match inputs specified by the user and displaying a list of the retrieved polygon objects in a predetermined order on the screen; and
    determining the desired polygon object by repeating the above steps;
    wherein the polygon names and the polygon objects are correlated with one another in the data table.

2. A method for searching a polygon object as defined in claim 1, wherein said step of prompting the user to specify a desired polygon object includes a step of displaying a keyboard and an input field on the screen to allow the user to enter characters concerning the desired polygon object in the input field.

3. A method for searching a polygon object as defined in claim 1, wherein said step of prompting the user to specify a desired polygon object includes a step of displaying a list of candidate entries retrieved from the data tables on the screen in response to information specified by the user.

4. A method for searching a polygon object as defined in claim 1, wherein said step of prompting the user to specify a desired polygon object includes a step of specifying a location of the polygon object stored in the data table through the screen where the location is specified by a name of administrative region.

5. A method for searching a polygon object as defined in claim 4, wherein said name of administrative region includes at least a city name and wherein the center point of the polygon object is used to determine to which administrative region the polygon object belongs.

6. A method for searching a polygon object as defined in claim 1, wherein said step of prompting the user to specify a desired polygon object includes a step of specifying a location of the polygon object stored in the data table through the screen where the location is specified by a name of administrative region, and a step of specifying a polygon name stored in the data table through the screen after specifying the administrative region.

7. A method for searching a polygon object as defined in claim 1, wherein said step of prompting the user to specify a desired polygon object includes a step of specifying a polygon name stored in the data table through the screen without specifying an administrative region.

8. A method for searching a polygon object as defined in claim 1, wherein said step of creating the data table based on the polygon locations includes a step of obtaining a position of a center point of the polygon object by a processor executing a program to determine in which administrative region the center point of the polygon object is located where the administrative region includes a state, a county, and a city.

9. A method for searching a polygon object as defined in claim 8, further comprising a step of calculating a route to the selected polygon object and conducting a route guidance operation to the selected polygon object by the processor executing the program, wherein, when the center point of the polygon object is not on any road, an address of the polygon object for calculating the route is determined by shifting the center point to an adjacent point on a road so that an address of the point on the road can be used as a destination address for the route calculation.

10. A method for searching a polygon object as defined in claim 3, said step of displaying a list of candidate entries includes a step of listing the candidate entries on the screen in an order of distance or an alphabetical order.

11. An apparatus for searching a polygon object for a navigation system, comprising:
   a processor executing a program for finding a center point of a polygon object where the polygon object is a two-dimensional topological object expressed in a map database of the navigation system;
   a processor executing a program for creating data tables which show lists of information on the polygon objects in the map database based on polygon names and polygon locations, respectively, when the polygon object has not been associated with points of interest (POIs) in a map database of the navigation system, where each of the polygon locations is defined by the center point of the polygon object;
   a screen of the navigation system designed for prompting a user to specify a desired polygon object either by a polygon name or a polygon location;
   said processor retrieves candidate polygon objects from the corresponding data tables that match inputs specified by the user and causes the screen of the navigation system to display a list of the retrieved polygon objects in a predetermined order; and
   an input device of the navigation system for allowing the user to finalize selection of the desired polygon object;
   wherein the polygon names and the polygon objects are correlated with one another in the data table.

12. An apparatus for searching a polygon object as defined in claim 11, wherein said screen for prompting the user to specify a desired polygon object further displays a keyboard and an input field to allow the user to enter characters concerning the desired polygon object in the input field.

13. An apparatus for searching a polygon object as defined in claim 11, wherein said screen for prompting the user to specify a desired polygon object further displays a list of candidate entries retrieved from the data tables in response to information specified by the user.

14. An apparatus for searching a polygon object as defined in claim 11, wherein said screen for prompting the user to specify a desired polygon object further displays a location of the polygon object stored in the data table where the location is specified by a name of administrative region.

15. An apparatus for searching a polygon object as defined in claim 14, wherein said name of administrative region includes at least a city name and wherein the center point of the polygon object is used to determine to which administrative region the polygon object belongs.

16. An apparatus for searching a polygon object as defined in claim 11, wherein said screen for prompting the user to specify a desired polygon object further displays a location of the polygon object stored in the data table where the location is specified by a name of administrative region, and said screen further displays a polygon name stored in the data table after specifying the administrative region.

17. An apparatus for searching a polygon object as defined in claim 11, wherein said screen for prompting the user to specify a desired polygon object further displays a polygon name stored in the data table without specifying an administrative region.

18. An apparatus for searching a polygon object as defined in claim 11, wherein said processor executing the program for creating the data table based on the polygon locations further obtains data indicating a position of a center point of the polygon object to determine in which administrative region the center point of the polygon object is located where the administrative region includes a state, a county, and a city.

19. An apparatus for searching a polygon object as defined in claim 18, said processor further calculates a route to the selected polygon object and conducts a route guidance operation to the selected polygon object, wherein, when the center point of the polygon object is not on any road, an address of the polygon object for calculating the route is determined by shifting the center point to an adjacent point on a road so that an address of the point on the road can be used as a destination address for the route calculation.

20. An apparatus for searching a polygon object as defined in claim 13, said screen of the navigation system displays a list of candidate entries in an order of distance or alphabet.

* * * * *